United States Patent [19]

Louboutin

[11] 4,338,202

[45] Jul. 6, 1982

[54] WATER TREATMENT PROCESS AND APPARATUS AND DEVICE FOR THE DISTRIBUTION OF WATER TO BE TREATED INTO AND FOR THE RECOVERY FROM WASHING LIQUID FROM A WATER TREATMENT FILTER APPARATUS

[75] Inventor: Robert Louboutin, La Celle-Saint-Cloud, France

[73] Assignee: Degremont, Rueil-Malmaison, France

[21] Appl. No.: 240,362

[22] Filed: Mar. 4, 1981

[30] Foreign Application Priority Data

Mar. 26, 1980 [FR] France .................................. 80 06665

[51] Int. Cl.$^3$ ............................................. B01D 23/24
[52] U.S. Cl. ................................... 210/795; 210/797; 210/275; 210/293
[58] Field of Search ............................ 210/793–795, 210/797, 293, 274–279, 785–786

[56] References Cited

U.S. PATENT DOCUMENTS

| 2,559,784 | 7/1951 | Moore | 210/795 |
| 3,613,888 | 10/1971 | Harris | 210/794 |
| 4,076,625 | 2/1978 | Scholten et al. | 210/275 |
| 4,118,322 | 10/1978 | San Roman | 210/293 |

*Primary Examiner*—Benoît Castel
*Attorney, Agent, or Firm*—Wenderoth, Lind & Ponack

[57] ABSTRACT

A device for the distribution of water to be treated into and for the recovery of washing liquid from a water treatment filter apparatus of the type including a tank containing therein a filter material includes a channel coupled to and extending along the length of the tank, the channel receiving therein water to be treated. The channel has an opening into the interior of the tank at a level above the filter material. The opening is defined at the lower portion thereof by an overflow over which the water to be treated flows from the channel to the tank. The overflow includes a first inclined plane inclined downwardly and away from the channel in a direction toward the tank and a second inclined plane inclined downwardly and toward the channel from the first inclined plane. The inclined planes extend into the tank and form a deflector structure to prevent any filter material from passing through the opening during backwashing of the filter material.

24 Claims, 4 Drawing Figures

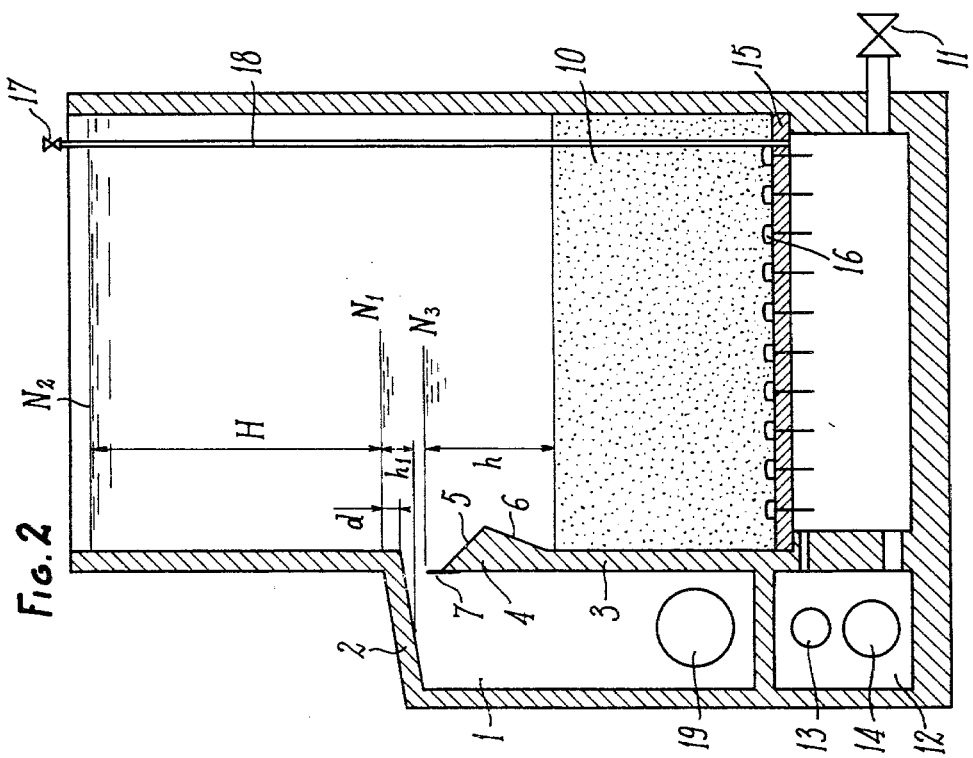
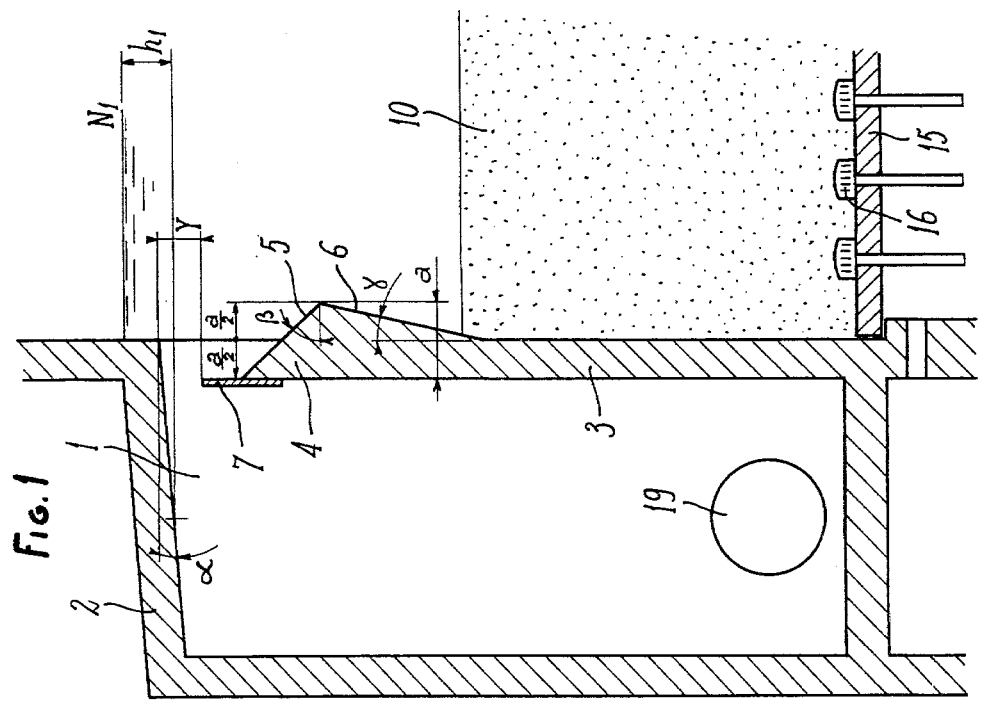

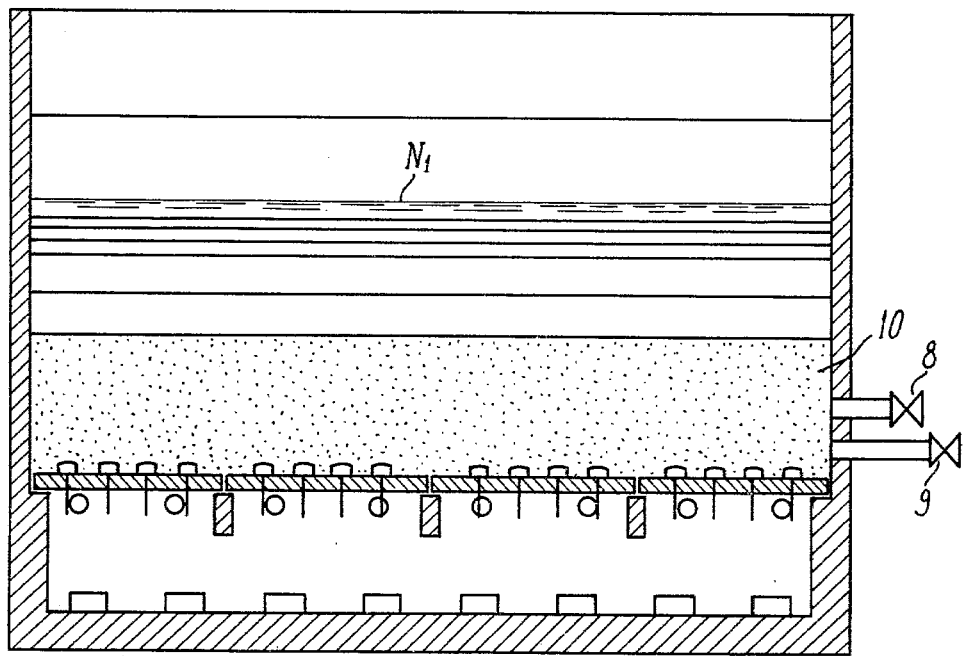
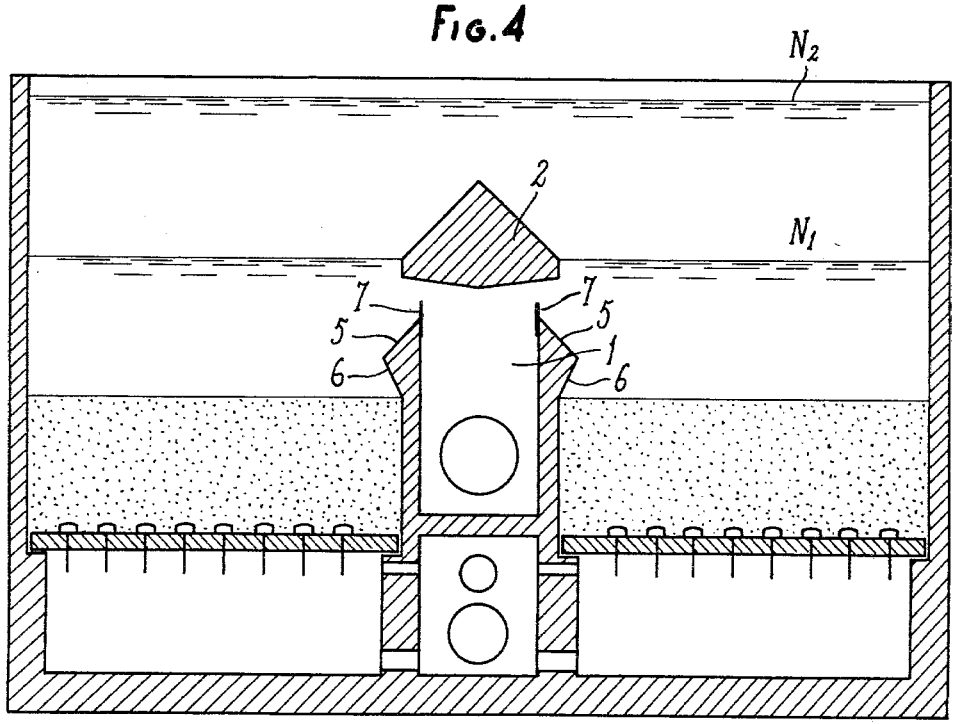

WATER TREATMENT PROCESS AND APPARATUS AND DEVICE FOR THE DISTRIBUTION OF WATER TO BE TREATED INTO AND FOR THE RECOVERY FROM WASHING LIQUID FROM A WATER TREATMENT FILTER APPARATUS

BACKGROUND OF THE INVENTION

The present invention relates to a process and apparatus for the treatment of water and to a device for the distribution of water to be treated into and for the recovery of washing liquid from a water treatment apparatus. The present invention is particularly applicable to water treatment apparatuses of the type including at least one layer of granular filtering material in which at least one of the filtering materials is of low volume mass, for example treated carbons, such as treated anthracite activated charcoal, pumice stone, expanded clay, etc. The present invention is particularly directed to the treatment of all types of water, for example sewage, industrial waste, etc., and the present invention is not intended to be limited to the treatment of any particular type or quality of water.

Filter apparatuses employing filter material of low volume mass are known and generally are in the form of a parallelepipedal vat or tank having a bottom equipped with drainage channels and intended to support the filter material or materials. The water to be filtered is distributed by any means over the mass of filter material. As is known, it is periodically necessary to wash such filter material to remove therefrom clogging material retained during the water treatment operation. The most effective washing technique for this type of filter material involves a backwashing technique consisting of an initial unclogging operation by the simultaneous injection of washing liquid, such as water, and gas, such as air, in a countercurrent or upward direction through the bottom support and through the mass of filtering material, and then a rinsing operation by injecting water only as a rinsing liquid upwardly through the filtering material to remove therefrom impurities and clogging material loosened from the filtering material by the previous operation. The washing liquid and loosened clogging materials are then evacuated into a channel normally arranged along the filter apparatus and connected to a drain.

This washing operation, applied to a filter apparatus having a filtering medium of a material which is light in weight, for example treated anthracite, presents certain inherent operational difficulties. Thus, for example with treated anthracite having a volume mass on the order of 1500 kg/m$^3$, while that of sand is 2500 kg/m$^3$, during the unclogging operation of passing washing liquid and gas upwardly through the filter material, there occurs the phenomenon that a substantial portion of the filtering material is entrained and lifted or floated upwardly within the tank. Thus, when the level of the washing liquid-gas emulsion reaches the overflow of the channel for recovery of the wash water, a portion of the filter material is also discharged or evacuated to the drain along with the wash water. This of course is an undesirable occurrence.

To avoid this disadvantage, two solutions have previously been proposed. The first such proposal involves positioning the overflow of the wash water recovery channel at a height of 1.5 to 2.0 meters above the upper level of the mass of filter material. Then, prior to the simultaneous injection of washing liquid and gas, the filter apparatus is emptied of liquid until the level of water in the device essentially matches that of the mass of filtering material. Thereafter, the unclogging operation by the simultaneous injection of washing liquid and gas is performed. During this operation, the water level in the filter rises to the level of the overflow of the wash water recovery channel. Thus, the wash water is stored during the unclogging operation without any discharge of such water into the recovery channel. A gas layer which has been formed beneath the bottom support is drained off, and it is necessary to wait until the filter material entrained in the washing liquid-air emulsion is separated, i.e. by settling. Then the filter material is rinsed with washing liquid alone, and such washing liquid overflows into the channel placed at the upper part of the filter apparatus. This solution has, however, certain drawbacks. Thus, the operation of rinsing with washing liquid alone, intended to evacuate into the recovery channel any impurities or clogging material detached from the filter material, requires a major flow of water because of the high position of the recovery channel. Additionally, the complete evacuation of the impurities or clogging material from the interior of the tank takes a very long time.

The second known solution makes it possible to avoid the above-disadvantage during the operation of rinsing with washing liquid alone, and such solution involves preceding as discussed above during the unclogging operation with injection of washing liquid and gas, but of evacuating the rinse water during the rinsing operation by means of a valve which is closed during the unclogging operation. However, this arrangement presents certain other disadvantages. Thus, applied to an industrial operational filter apparatus of classic dimensions, for example 10 meters long and 4 meters wide, this solution requires a 4 meter wide motorized control valve, and is therefore very expensive. In addition, for a filter of this size, the length of the rinsing operation is considerably increased, the maximum course of the rinse water in this arrangement being 10 meters.

SUMMARY OF THE INVENTION

With the above discussion in mind, it is an object of the present invention to provide a water treatment process and apparatus which overcome the prior art disadvantages.

It is a further object of the present invention to provide a device for the distribution of water to be treated into and for the recovery of washing liquid from a water treatment filter apparatus of the general type discussed above, whereby it is possible to obviate the prior art disadvantages.

These objects are achieved in accordance with one aspect of the present invention by the provision of a water treatment process and apparatus whereby a tank contains therein filter material. A channel is coupled to and extends along the length of the tank. The channel has an opening into the tank at a level above the filter material. The opening is defined at the lower portion thereof by an overflow which forms a mouth or spout. The overflow includes a first inclined plane inclined downwardy and inwardly into the tank and a second inclined plane inclined downwardly and outwardly of the tank from the first inclined plane. The upper end of the channel is closed by an upper wall having an inner surface which inclines upwardly toward the tank. During a normal water treatment operation, water to be treated is introduced into the channel and is distributed therefrom into the tank by passing through the opening and over the overflow. The water to be treated then passes downwardly through the filter material, thereby forming treated water. The treated water is removed from the tank at a location at the bottom of or below the filter material. During this normal water treatment operation, the filter material filters from the water various impurities and matter in suspension and retains such impurities. These impurities after a period of time tend to clog the filter material, and it is therefore necessary to terminate the water treatment operation and conduct a washing operation to remove the clogging material from the filter material. The washing operation includes passing washing liquid and gas, for example water and air, upwardly through the filter material to loosen therefrom the clogging material. During this operation, the channel is maintained under hydrostatic pressure, for example by maintaining the liquid level in the tank above the opening. During this operation, a portion of the filter material which is light in weight is entrained by and lifted upwardly within the tank by the washing liquid and gas. In accordance with the present invention, this entrained and lifted filter material, at the area adjacent the channel, is contacted against the second inclined plane and is thereby deflected away from the opening, thereby preventing loss of filter material from the tank and into the channel. At the completion of the injection of the washing liquid and gas, the previously entrained and upwardly lifted filter material is allowed to settle. During this settling operation, that portion of the settling filter material adjacent the channel is contacted against the first inclined plane and is deflected and guided thereby away from the opening and back into the interior of the tank. Thus, the inclined planes which extend into the interior of the tank form deflector and guide elements for preventing any of the filter material from passing through the opening from the tank into the channel during the unclogging operation. After the unclogging operation, the liquid level in the tank is lowered to the level of the overflow, and thereafter washing liquid only is passed as a rinsing liquid upwardly through the filter material, thereby removing the loosened clogging material from the filter material. This rinsing liquid and clogging material then flow over the overflow and through the opening into the channel, from which they are discharged to a drain.

Preferably, the channel and opening extend along the entire length of tank. In accordance with one embodiment of the invention, the channel extends along an exterior wall of the tank. In accordance with a further embodiment of the invention, the channel extends longitudinally along the central axis of the tank, and the channel has therein oppositely facing openings directed into separate portions of the tank, each such opening including at a lower portion thereof a respective overflow.

The uppermost portion of the inclined inner surface of the upper wall of the channel is located at a position spaced above the overflow.

The thickness in the horizontal direction of the overflow and of the first inclined plane is preferably from 30 to 40 cm, with at least half of such horizontal thickness extending into the interior of the tank.

The first inclined plane extends at an angle of from 35°–45° to the horizontal, and the second inclined plane extends at an angle of approximately 15° to the vertical.

There may further be provided a member, for example a screen, adjustably mounted on an inner surface of the channel and extending upwardly from the overflow into the opening. The vertical position of such member is adjustable, whereby the vertical dimension or size of the opening is adjustable.

BRIEF DESCRIPTION OF THE DRAWINGS

Other objects, features and advantages of the present invention will be apparent from the following detailed description, with reference to the accompanying drawings, wherein:

FIG. 1 is a detailed cross-sectional view of a device according to the present invention;

FIG. 2 is a cross-sectional view of a water treatment filter apparatus according to the present invention equipped with the device of FIG. 1;

FIG. 3 is a longitudinal cross-section of the apparatus shown in FIG. 2; and

FIG. 4 is a cross-section of a modified embodiment of a water treatment filter apparatus according to the present invention and including a modified device according to the present invention.

DETAILED DESCRIPTION OF THE INVENTION

With reference now to FIGS. 1–3, a first embodiment of the invention will be described. Thus, a water treatment filter apparatus includes a tank containing therein filter material 10 supported in a known manner by a bottom support having therein known types of nozzle devices 16. A channel 1 is coupled to and extends along the entire length of the tank. The channel 1 and the tank share a common vertical wall 3. The channel has a longitudinally extending opening which opens into the tank at a level above the filter material 10. The opening is defined at the lower portion thereof by an overflow 4 which in the illustrated embodiment is integral with the dividing wall 3. The overflow 4 is formed by a first inclined plane 5 inclined downwardly and inwardly into the interior of the tank and a second inclined plane 6 inclined downwardly and outwardly of the tank from the innermost and lowermost end of the first inclined plane 5. The inclined planes 5 and 6 extend into the interior of the tank to form a deflector and guide structure, to be discussed in more detail below. The upper end or portion of channel 1 is closed by an upper wall 2 having an inner lower surface inclined upwardly and toward the tank. The uppermost portion or inner edge of the inner surface of wall 2 opens into the interior of the tank and is positioned at a location spaced above the mid thickness, taken in the horizontal direction, of overflow 4.

The inner surface of upper wall 2 of the channel 1 is inclined to the horizontal at an angle $\alpha$ of approximately 5°. The horizontal thickness a of overflow 4 and the horizontal extent of first inclined plane 5 is approximately between 30 and 40 cm. At least half of this horizontal extent or thickness extends into the interior of the tank from the tank wall 3. First inclined plane 5 is inclined at an angle $\beta$ of from 35° to 45° to the horizontal. Second inclined plane 6 extends at an angle $\gamma$ of approximately 15° to the vertical. The inclined plane 5, and specifically that half thereof extending into the interior of the tank, forms a deflector nozzle, to be discussed in more detail below, and inclined plane 6 forms a deflector, in a manner to be discussed in more detail below.

A member 7, such as a screen, is adjustably mounted on an inner surface of the channel, for example an inner surface of overflow 4, and extends upwardly therefrom into the opening. Vertical adjustment of member 7 makes it possible to adjust the vertical dimension or size y of the opening between the upper level of the overflow assembly, including the member 7, and the highest point of the inner surface of the upper wall 2 of the channel. This makes it possible to adjust the water flow through the opening.

The channel 1 has extending thereinto a conduit for supplying water to be treated, such conduit being closable by a valve 8, and a wash water evacuation conduit including a valve 9. The conduits including valves 8 and 9 appear in FIG. 3 to open into the interior of the tank, but such conduits in fact open into channel 1. The conduit including valve 9 is connected to opening 19 shown in FIGS. 1 and 2. The tank is provided, at a position below the filter material 10, with a conduit including a valve 11 for the discharge of treated water after passage through the filter material. The apparatus includes a chamber 12, in the illustrated arrangement positioned beneath the channel 1, having conduits 14 and 13 for the supply of washing liquid and gas, for example water and air, respectively.

The manner of operation of the device of FIGS. 1–3 will now be described.

During a normal water treatment operation, water to be treated is introduced into channel 1 by the conduit including valve 8. Such water to be treated is distributed into the interior of the tank along the entire length of the opening, and such water to be treated flows over overflow 4 and downwardly into the interior of the tank. The water to be treated passes downwardly through the filter material 10, thereby forming treated water which passes through nozzles 16 in bottom support 15 and is withdrawn through the conduit including valve 11. During the water treatment operation, the filter material 10 filters out impurities and matter from the water to be treated and retains such matter as clogging material. It is therefore periodically necessary to interrupt the normal water treatment operation and to conduct a washing operation to remove the clogging material from the filter material.

This washing operation is carried out by closing valve 8 and thus stopping the supply of water to be treated. The valve 11 is maintained open until the level of the water has descended to level N1 which is at a distance d above the highest portion of the inner surface of wall 2. The valve 11 is then closed such that the channel 1 is maintained full of water and is subjected to a hydrostatic pressure corresponding to a column of water having height h1.

Then, an unclogging operation is commenced by introducing washing liquid and gas through conduits 14 and 13. Such washing liquid and gas penetrate through nozzles 16 and bottom support 15 in a known manner, and the emulsion or mixture thereby formed is distributed into the filter material 10 and passes upwardly therethrough to loosen impurities and clogging material retained during the previous water treatment operation. The injection of the washing liquid and gas is maintained until the liquid level within the tank reaches the level N2, at which the unclogging operation is terminated. Throughout the unclogging operation, the channel 1 remains filled and is under a hydrostatic pressure. Thus, valve 9 is closed, so there is no flow through the channel 1.

During the unclogging operation, the injection of washing liquid and gas upwardly through the filter material 10, due to the fact that at least a portion of the filter material 10 is light in weight, entrains and lifts upwardly a portion of such filter material. This entrained and lifted filter material adjacent the channel is contacted against second inclined plane 6 and is thereby deflected away from the opening, thereby preventing such entrained and lifted filter material from passing through the opening and out of the tank. Turbulence or swirling created by deflection due to inclined plane 6 does not result in flow toward the opening beyond half of the thickness a. Any such entrained grains of light weight filter material projected by such swirling toward the opening are guided along inclined plane 5 back toward the interior of the tank. After the completion of the injection of the washing liquid and gas, the entrained grains of filter material are allowed to settle. Such settling filter material adjacent the channel is contacted against inclined plane 5 and thereby deflected and guided away from the opening and back into the interior of the tank. It is to be understood that the value of angle $\beta$ of inclined plane 5 with respect to the horizontal is such that during the settling of the light weight filter material, the settling filter material contacting inclined plane 5 is naturally guided backwardly toward the interior of the tank.

During an experiment on a water treatment filter apparatus according to the present invention, there was a total absence of any loss of the filtering material during the unclogging operation. The filter material of the experiment was of the two-layer type including a first layer 0.4 mm thick of sand with an effective size of 0.95 mm, having on top thereof a layer 0.6 m thick of Hydroanthracite (commercial name of a treated anthracite), with a granulometry between 1.4 and 2.5 mm.

Valve 17 is opened to evacuate through tube 18 any air which accumulates beneath the bottom support 15.

After completion of the unclogging operation, a rinsing operation is commenced. Specifically, valve 9 is opened to allow discharge of water through channel 1 such that the liquid level within the tank lowers to level N3 corresponding to the top of the overflow 4 (or to the top of member 7 if provided). Then, washing liquid only, as a rinsing liquid, is introduced through conduit 14 and passes upwardly through the filter material 10, thereby removing loosened clogging material detached from the filter material during the preceding unclogging operation. The height h is maintained to be greater than the degree of expansion of the light weight filter material under the effect of the ascending flow of rinsing liquid, such that no filter material can be carried through the opening into the channel during the rinsing operation. The rinsing liquid and clogging material is discharged over the overflow and through the opening into the channel 1 wherefrom it is discharged to a drain through opening 19 and valve 9.

Upon the completion of the rinsing operation, the apparatus is then returned to its normal water treatment state. To do this, the supply of the rinse water is interrupted, valve 9 is closed, and valve 8 is opened. Thus, the channel 1 is filled up, and when the water reaches the level N3 of the overflow 4, the water to be treated is fed into the interior of the tank. The level continues to rise within channel 1, and due to the inclination of the inner surface of wall 2, any air found therein is entirely evacuated toward the interior of the tank. When the water level within the tank is at least equal to level N1, valve 11 is opened, and the normal water treatment operation commences.

It is to be understood that the operation of the present invention may be automated, particularly by utilization of automatic level detectors to determine levels N1 and N2, in a manner which will be apparent to those skilled in the art.

FIG. 4 illustrates a modified embodiment of the apparatus of the present invention. Thus, in the arrangement of FIG. 4, the channel 1 does not extend along an exterior wall of the tank, but rather extends longitudinally through the axial center of the tank. The channel 1 has therein a pair of oppositely facing openings adapted to open into laterally spaced separate portions of the tank. Each such opening includes a lower portion thereof a respective overflow formed of inclined planes 5 and 6, and if desired provided with members 7. The device of FIG. 4 otherwise operates in the same manner as the device of FIGS. 1–3.

Although the present invention has been described and illustrated with respect to specifically preferred features thereof, it is to be understood that various modification may be made without departing from the scope of the present invention.

I claim:

1. In a water treatment filter apparatus of the type including a tank containing therein filter material, means for introducing water to be treated into said tank over said filter material to pass downwardly therethrough and be treated, means for withdrawing treated water from said tank after passage through said filter material, means for periodically washing said filter material to remove therefrom clogging material retained therein during the water treatment, said washing means including means for first passing washing liquid and gas upwardly through said filter material to loosen therefrom said clogging material and for then passing washing liquid only as a rinsing liquid upwardly through said filter material, and means for removing from said tank said rinsing liquid and loosened clogging material, the improvement wherein said means for introducing said water to be treated and said means for removing said rinsing liquid and clogging material comprise:

a channel coupled to and extending along the length of said tank;

first conduit means for supplying water to be treated into said channel;

said channel having an opening into said tank at a level above said filter material, said opening being defined at the lower portion thereof by an overflow over which said water to be treated passes from said channel to said tank, said overflow including a first inclined plane inclined inclined downwardly and inwardly into said tank and a second inclined plane inclined downwardly and outwardly of said tank from said first inclined plane, said inclined planes extending into said tank to form deflector and guide means for preventing any of said filter material from passing through said opening from said tank during passing of washing liquid and gas upwardly through said filter material, and said opening forming means for allowing rinsing liquid and loosened clogging material to overflow from said tank into said channel;

means closing the upper end of said channel for aiding in maintaining said channel under hydrostatic pressure during said passing of said washing liquid and gas upwardly through said filter material; and second conduit means for discharging said rinsing liquid and clogging material from said channel.

2. The improvement claimed in claim 1, wherein said channel and said opening extend along the entire length of said tank.

3. The improvement claimed in claim 1, wherein said closing means comprises an upper wall having an inner surface inclined upwardly toward said tank, the uppermost portion of said inner surface opening into said tank at a position spaced above said overflow.

4. The improvement claimed in claim 1, further comprising means for opening said first conduit means and for closing said withdrawing means to maintain the level of water in said apparatus above said opening and to thus maintain said channel under said hydrostatic pressure.

5. The improvement claimed in claim 1, wherein the thickness in the horizontal direction of said overflow and of said first inclined plane is from 30 to 40 cm, at least half of said horizontal thickness extending into said tank.

6. The improvement claimed in claim 1, wherein said first inclined plane extends at an angle of from 35°–45° to the horizontal, and said second inclined plane extends at an angle of approximately 15° to the vertical.

7. The improvement claimed in claim 1, further comprising a screen member adjustably mounted on an inner surface of said channel and extending upwardly from said overflow into said opening by a vertically adjustable amount.

8. The improvement claimed in claim 1, wherein said channel extends along an exterior wall of said tank.

9. The improvement claimed in claim 1, wherein said channel extends along the center of said tank, said channel having therein oppositely facing said openings directed into separate portions of said tank, each said opening including at a lower portion thereof a respective said overflow.

10. A device for the distribution of water to be treated into and for the recovery of washing liquid from a water treatment filter apparatus of the type including a tank containing therein a filter material through which the water to be treated passes downwardly, with the filter material periodically being subjected to a washing operation to remove from the filter material clogging material retained therein during the water treatment by first passing washing liquid and gas upwardly through the filter material to loosen therefrom the clogging material and by then passing washing liquid only as a rinsing liquid upwardly through the filter material, said device comprising:

a channel adapted to be coupled to and extend along the length of the tank, said channel receiving therein water to be treated;

said channel having an opening adapted to open into the interior of the tank at a level above the filter material, said opening being defined at the lower portion thereof by an overflow over which said water to be treated is adapted to pass from said channel to the tank, said overflow including a first inclined plane inclined downwardly and away from said channel in a direction adapted to be toward the tank and a second inclined plane inclined downwardly and toward said channel from said first inclined plane, said inclined planes adapted to extend into the tank to form deflector and guide means for preventing any of the filter material from passing through said opening from the tank during the washing operation of the filter material of the tank, and said opening forming means for allowing washing liquid and loosened clogging material to overflow from the tank into said channel; and means closing the upper end of said channel for aiding in maintaining said channel under hydrostatic pressure during the passing of the washing liquid and gas upwardly through the filter material.

11. A device as claimed in claim 10, further comprising first conduit means for supplying said water to be treated into said channel, and second conduit means for discharging from said channel washing liquid and clogging material adapted to be received therein.

12. A device as claimed in claim 10, wherein said channel and said opening are adapted to extend along the entire length of the tank.

13. A device as claimed in claim 10, wherein said closing means comprises an upper wall having an inner surface inclined upwardly in a direction adapted to be toward the tank, the uppermost portion of said inner surface adapted to open into the tank and being spaced above said overflow.

14. A device as claimed in claim 10, wherein the thickness in the horizontal direction of said overflow and of said horizontal plane is from 30 to 40 cm, at least half of such horizontal thickness adapted to extend into the tank.

15. A device as claimed in claim 10, wherein said first inclined plane extends at an angle of from 35°–45° to the horizontal, and said second inclined plane extends at an angle of approximately 15° to the vertical.

16. A device as claimed in claim 10, further comprising a member adjustably mounted on an inner surface of said channel and extending upwardly from said overflow into said opening by a vertically adjustable amount.

17. A device as claimed in claim 10, wherein said channel is adapted to extend along an exterior wall of the tank.

18. A device as claimed in claim 10, wherein said channel is adapted to extend along the center of the tank, and said channel has therein oppositely facing said openings adapted to open into separate portions of the tank, each said opening including at a lower portion thereof a respective said overflow.

19. A water treatment process comprising:
providing a water treatment filter apparatus including a tank containing therein filter material, a channel coupled to and extending along the length of said tank, said channel having an opening into said tank at a level above said filter material, said opening being defined at the lower portion thereof by an overflow including a first inclined plane inclined downwardly and inwardly into said tank and a second inclined plane inclined downwardly and outwardly of said tank from said first inclined plane, and the upper end of said channel being closed;

conducting a water treatment operation comprising:
introducing water to be treated into said channel;
distributing said water to be treated to said tank by passing said water to be treated through said opening and over said overflow into said tank;
passing said water to be treated downwardly through said filter material, said filter material filtering out matter from said water to be treated and retaining said matter as clogging material, thereby forming treated water; and
removing said treated water from said tank at a location below said filter material; and
periodically terminating said water treatment operation and conducting a washing operation to remove said clogging material from said filter material, said washing operation comprising:
passing washing liquid and gas upwardly through said filter material to loosen therefrom said clogging material, while maintaining said channel under hydrostatic pressure, a portion of said filter material being entrained by and lifted upwardly within said tank by said washing liquid and gas, contacting said entrained and lifted filter material adjacent said channel against said second inclined plane and thereby deflecting said filter material away from said opening, and allowing said entrained and lifted filter material to settle, while contacting said settling filter material adjacent said channel against said first inclined plane and thereby deflecting and guiding said settling filter material away from said opening;
thereafter passing washing liquid only as a rinsing liquid upwardly through said filter material, thereby removing said loosened clogging material from said filter material;
passing said rinsing liquid and said clogging material through said opening into said channel; and
discharging said rinsing liquid and said clogging material from said channel.

20. A process as claimed in claim 19, wherein said maintaining said channel under hydrostatic pressure comprises maintaining the liquid level in said tank above said opening.

21. A process as claimed in claim 20, wherein said apparatus includes means for introducing water to be treated into said channel and means for removing treated water from said tank, and said maintaining said liquid level comprises closing said treated water removing means and opening said water to be treated introducing means until said liquid level is at a determined level above said opening.

22. A process as claimed in claim 19, further comprising, after said passing said washing liquid and gas and prior to said passing said washing liquid only, lowering the liquid level in said tank to the level of said overflow.

23. A process as claimed in claim 22, wherein said apparatus includes means for withdrawing said rinsing liquid and said clogging material from said channel, and said lowering said liquid level in said tank comprises opening said withdrawing means and thereby discharging therethrough liquid in said channel and liquid in said tank above the level of said overflow.

24. A process as claimed in claim 19, further comprising adjusting the vertical dimension of said opening.

* * * * *